UNITED STATES PATENT OFFICE.

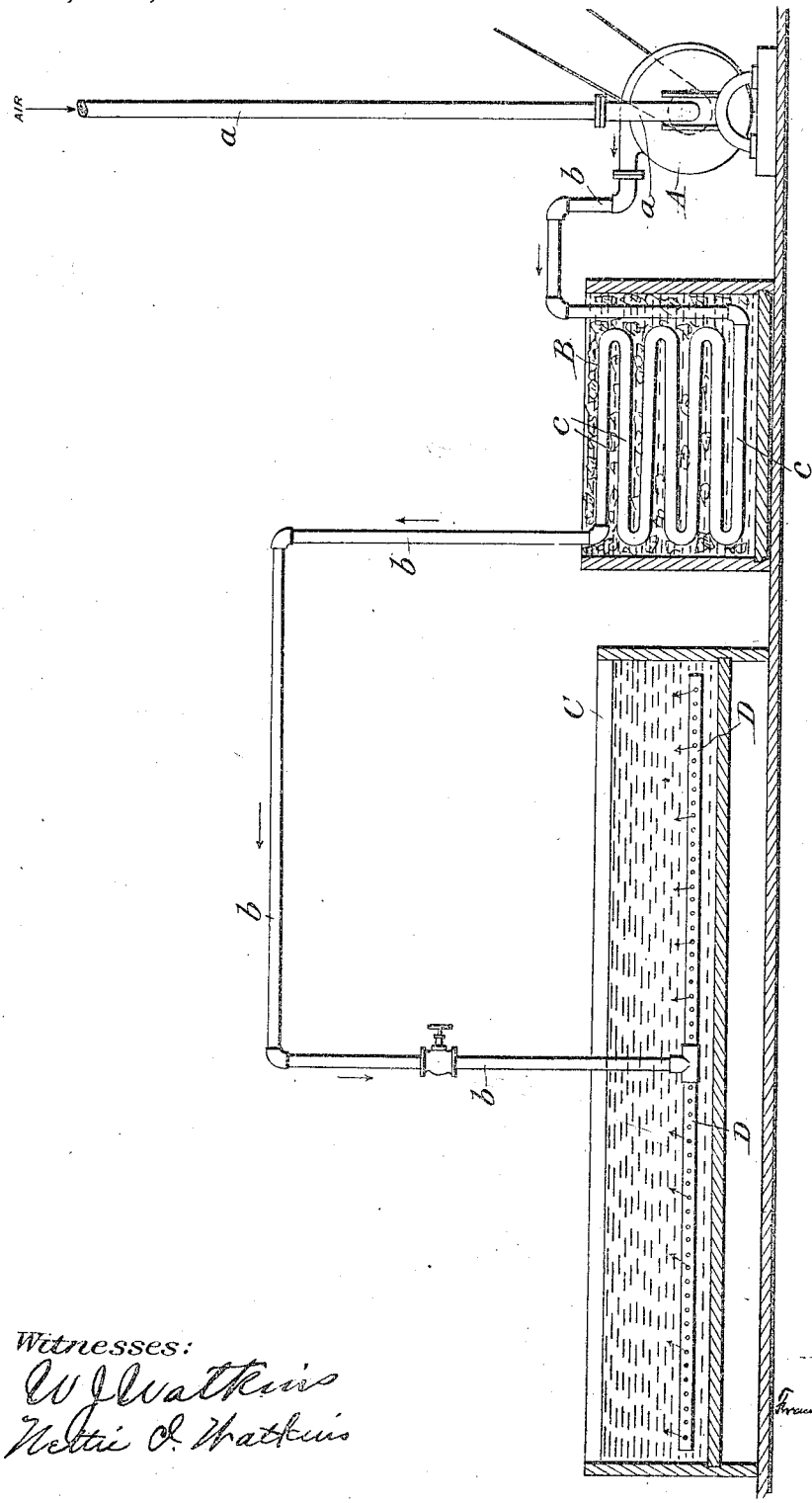

FRANKLIN H. STANLEY, OF CLEVELAND, OHIO, ASSIGNOR TO STANLEY PATENTS COMPANY, A CORPORATION OF DELAWARE.

PROCESS OF TREATING CREAM AND SIMILAR SUBSTANCES.

1,075,514.　　　　Specification of Letters Patent.　　Patented Oct. 14, 1913.

Application filed December 21, 1907. Serial No. 407,659.

*To all whom it may concern:*

Be it known that I, FRANKLIN H. STANLEY, a citizen of the United States, residing at Cleveland, in the county of Cuyahoga and State of Ohio, have invented a certain new and useful Process of Treating Cream and Similar Substances, of which the following is a full, clear, and exact specification.

This invention relates to the art of treating cream and similar substances, either in their natural or renovated state and has more particular application to this treatment toward the end of manufacturing butter.

The nutty and aromatic flavor characteristic of high grade butter is due to the degree and character of the germs or bacteria contained in the cream or similar substance from which such butter is made. Favorable or pleasant bacteria, to produce beneficial effects, must be present in such character and quantity as to sensibly influence the character of the cream and consequent flavor of the butter. Certain germs, bacteria, and other substance, are found to have a deleterious effect, and to impart a disagreeable flavor or an objectionable odor, one or both, and possibly produce an injurious effect, from a sanitary standpoint, upon the cream or butter; while other bacteria have the contrary effect—that is, they render the cream or butter palatable as to flavor, and fragrant as to odor, and sanitary as a whole.

It is the object of the present invention to impart to cream and butter a desirable, aromatic flavor, a pleasant aroma, and eliminate from the same for all practicable purposes objectionable odors or flavors, or both.

The process which is utilized in carrying out this invention will be hereinafter more fully specified, described and particularly pointed out in the claims.

A process of treatment of the cream or similar substance which has been found successful in practice, and which forms the subject matter of the present invention, may be described as follows: The cream or similar substance may be first treated in the usual way, to cleanse it and extract mechanically, as far as possible, such germs as it may contain, and this portion of the treatment is, of course, no part of the present invention. The cream or similar substance is next inoculated with a starter containing lactic acid bacteria; and then this cream or similar substance is impregnated with oxygen, either in its pure state or with any desired mixture, such as air; and this impregnation with oxygen or air is continued for an appreciable period, while the cream is maintained at a proper temperature; and after the cream has ripened, during this process, the cream is churned in the usual way, and the resulting butter is found to be of a superior quality and of unusually high grade. The duration of this oxygen impregnation varies, according to circumstances. When there is a small proportion of lactic acid germs present, a greater duration of impregnation is necessary than when there is a large percentage of lactic acid germs; and, if the temperature of the cream is lowered considerably below the normal conditions of the work, then it requires a longer treatment with air, while on the contrary, if the temperature is raised very considerably, a shorter treatment with air is required.

I have found in practice that a temperature of approximately 54 degrees Fahr. is a good one for the purpose, under ordinary conditions, and that the cream or similar substance should then be impregnated with oxygen or air for a period of four or five hours, to get the best results. In any event, the cream is subjected to this air or oxygen for a sufficient period to produce the result of the aromatic flavor, the pleasing odor, and other advantageous effects desired. In fact, it has been found by the use of this process that a cream or similar substance is produced having the nutty flavor and aroma so especially desired, and that this flavor and aroma will be retained for a considerable period; also that no disagreeable or pernicious flavors or odors are perceptible.

In the drawing, I have illustrated diagrammatically an apparatus for introducing the air into the cream and maintaining the latter at the proper temperature.

The necessary pressure may be obtained by a pressure pump or blower $a$, which receives pure air through an intake pipe and discharges it through pipe $b$. The latter pipe leads through the coil $c$ of a cooling apparatus B, which reduces the temperature of the air to the desired point. The air pipe $b$, after leaving the cooler B, leads to a cream vat C, where it terminates in a horizontally disposed pipe or nozzle D, arranged in the lower part of the vat C. This nozzle D has numerous perforations which liberate the pure air and allow it to bubble up through the cream in the vat C, and thereby give such cream the desired aroma and flavor; this treatment being continued, as before explained, long enough to obtain the requisite result.

Actual experience has demonstrated that the oxygen or air act chemically upon the cream, and especially upon its microbic content, increasing the development of desirable aerobic bacteria, and inhibiting the growth of undesirable anaerobic bacteria. And the conclusion is therefore inevitable that it is the chemical action of the air upon the cream, and particularly upon its microbic content, that gives to this process its value, and it will therefore be readily seen that the details of the process may be widely varied by those skilled in the art without departing from the principle of the invention.

What I claim and desire to secure by Letters Patent is:

1. The herein described process of treating cream and similar substances, which consists in subjecting such substances to oxygen during the development of the lactic acid germs.

2. The herein described process of treating cream and similar substances, which consists in adding to the cream a starter containing a sufficient proportion of lactic acid germs, and then impregnating the mass with oxygen during the development of the lactic acid germs.

3. The herein described process of treating cream or similar substances, which consists in determining and insuring a sufficient proportion of lactic acid germs therein, and then impregnating the substances with oxygen during the development of such lactic acid germs, and therefore imparting to the substances the desired degree of aroma and flavor.

4. The herein described process of treating cream and similar substances, comprising first inoculating the same with a colony of lactic acid bacteria, and then applying oxygen thereto for a sufficient period to impart to the substances the desired degree of aroma and flavor.

5. The process of treating cream and similar substances, consisting first in inoculating the cream with lactic acid bacteria to a proper degree, and then impregnating with oxygen in the form of air, and continuing such impregnation for a proper period to give the desired degree of aroma and flavor.

6. The process of treating cream or other similar substances, consisting in inoculating such substances with a starter comprising lactic acid bacteria, then impregnating such substances with cool air and maintaining the supply of such air for approximately four or five hours.

FRANKLIN H. STANLEY.

Witnesses:
MELIDA A. OUGH,
EVAN GRIFFITHS.